(12) United States Patent
Malleshi

(10) Patent No.: US 7,029,720 B2
(45) Date of Patent: Apr. 18, 2006

(54) **DECORTICATED FINGER MILLET (*ELEUSINE CORACANA*) AND A PROCESS FOR PREPARING THE DECORTICATED FINGER MILLET**

(75) Inventor: Nagappa Gurusiddappa Malleshi, Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 297 days.

(21) Appl. No.: 10/108,185

(22) Filed: Mar. 26, 2002

(65) Prior Publication Data

US 2003/0185951 A1    Oct. 2, 2003

(51) Int. Cl.
*A23L 1/36* (2006.01)

(52) U.S. Cl. .................. 426/629; 426/506; 426/507; 426/508; 426/510; 426/615; 426/618

(58) Field of Classification Search ................ 426/615, 426/618, 506, 507, 508, 510, 509, 629
See application file for complete search history.

(56) References Cited

OTHER PUBLICATIONS

James A. Duke, Handbook of Energy Corps, 1983.*

* cited by examiner

*Primary Examiner*—Lien Tran
(74) *Attorney, Agent, or Firm*—Perkins Coie LLP

(57) ABSTRACT

The present disclosure provides decorticated finger millet (*Eleusine coracana*) and processes for preparing decorticated finger millet. In one implementation, decorticated finger millet is prepared by hydrating the millet near to its saturation moisture content and heat treating the hydrated millet to induce starch gelatinisation, rupture of granular structure, formation of lipid amylose complex and healing of cracks present in the endosperm. Controlled drying of the heat-treated millet may induce retrogradation of starch, hardening of endosperm tissue and reduction in the intactness of the endosperm with seed coat. This dried millet is moistened and short-tempered then passed through an abrasive mill to detach the seed coat.

14 Claims, 1 Drawing Sheet

SALIENT FEATURES OF THE PROCESS FOR PREPARING DECORTICATED MILLET

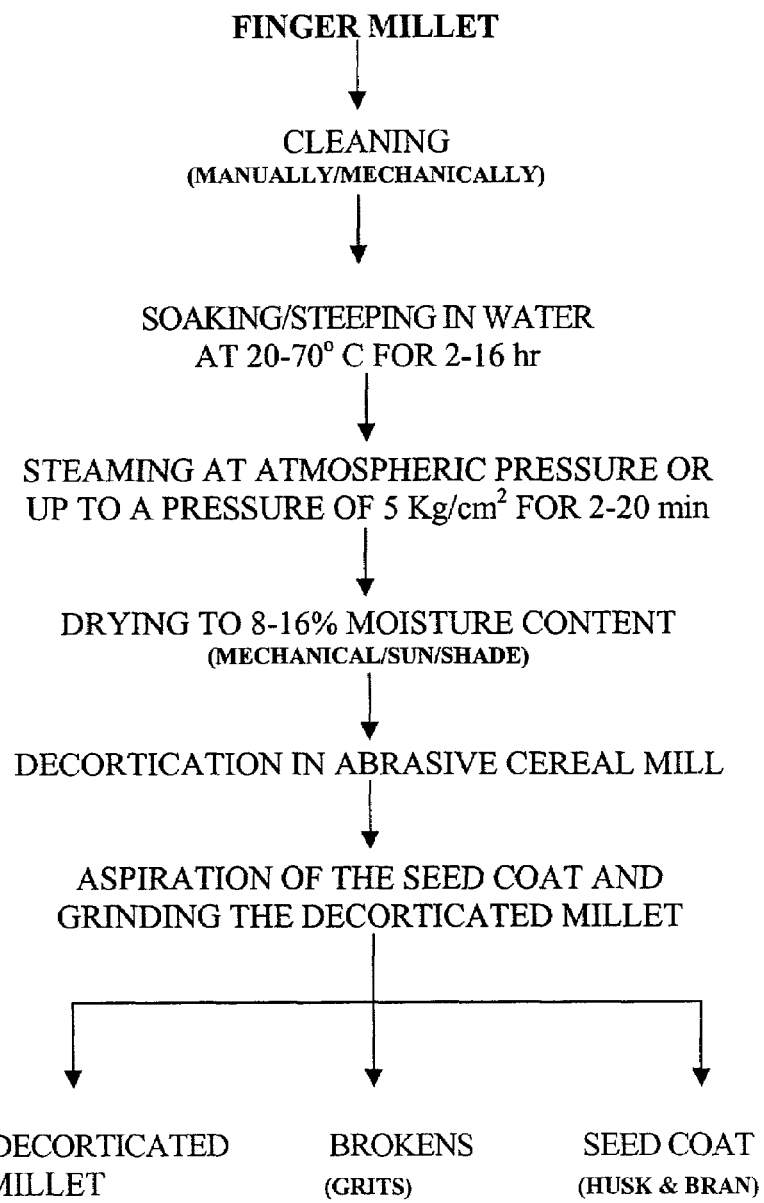
FIGURE 1: SALIENT FEATURES OF THE PROCESS FOR PREPARING DECORTICATED MILLET

DECORTICATED FINGER MILLET (*ELEUSINE CORACANA*) AND A PROCESS FOR PREPARING THE DECORTICATED FINGER MILLET

FIELD OF THE INVENTION

The present invention relates to a decorticated finger millet (*Eleusine coracana*) and a process for preparing the decorticated finger millet.

BACKGROUND AND PRIOR ART OF THE INVENTION

Finger millet (Ragi) is a small seeded, light brown to brick red colored minor cereal. It is a good source of carbohydrates, sulfur amino acids, dietary fiber and micronutrients and is the richest source of calcium among the cereals. Most of the millet produced is—pulverized and the whole meal is utilized for preparation of traditional Indian foods such as unleavened pancakes (roti) and thick porridge or dumpling (mudde) A small proportion is utilized to prepare popped and malt foods also. Epidemiological reports indicate that, regular consumption of the millet reduces incidences of diabetes mellitus, cardiovascular diseases, duodenal ulcer and other gastrointestinal tract related disorders. The millet is not amenable for cooking in the form of grains similar to rice, because, the seed coat of the millet grains is not removed and the seed coat not only affects the cooking quality but also its eating quality. Hence, the millet is always pulverized and the flour is used for food preparation and never cooked in the grain form. The endosperm of the millet is of floury texture but it is covered with the rigid seed coat. Since, the seed coat is firmly attached to the endosperm, both the endosperm and the seed coat fragment together to fine grits and flour during decortication or milling. Hence, efforts to decorticate the millet by hitherto known processes have not been successful. Therefore, the whole grain millet is pulverized and the meal is utilized for various food preparations. The pulverized seed coat imparts dark color, coarse fibrous texture and characteristic odor to the millet foods. These factors not only affect the nutritional quality of the millet products but also hinder their acceptability, especially by the non-traditional millet consumers.

Reference may be made to P. P. Kurien and H. S. R. Desikachar {Refining of millet flours-1. Ragi (*Eleusine coracana*). Journal of Food Science (Mysore), Vol. 11, 136–137, 1962}, wherein, the millet was steamed for about 2 min. moistened with 5% additional water, pulverized in Wiley mill and the meal was sifted through 250 n screen, to prepare a flour with a lower proportion of husk (seed coat) content.

Reference may also be made to P. P. Kurien and H. S. R. Desikachar {Preparation of a refined white flour from ragi (*Eleusine coracana*) using a laboratory mill. Journal of Food, Science and Technology, Vol. 3, 56–58, 1966}, wherein, moist-conditioning and milling the millet in laboratory wheat mill was effective for preparation of refined millet flour (the flour containing very low levels of seed coat).

The millet kernels were hardened by soaking in water at 65° C. for 3 hr. steaming for 30 min at atmospheric pressure and drying the same. The wet heat treatment enabled to prepare grits {H. S. R. Desikachar, Effect of wet heat treatment on the culinary qualities of ragi (*Eleusine coracana*). Journal of Food Science and Technology, Vol. 9, 149–150, 1972}. However, the seed coat was intact with the grits and affected the culinary and the sensory qualities of the foods prepared from the grits.

Wet heat treatment comprising of soaking the rough rice or paddy (*Oriza saliva*) in water, followed by steaming and drying, (parboiling), hardens the rice endosperm, heals, the cracks and improves its milling efficiency by minimizing the breakage during dehusking and debranning. This treatment to rice has also been shown to enhance its nutritional quality by increased retention of thiamine, minerals besides, improves the texture of cooked rice by reducing the stickiness also (K. R. Bhattacharya and S. Z. AH, Changes in rice during parboiling and properties of parboiled rice. In: Advances in Cereal Science and Technology, Vol. 7, 105–167,1985).

Likewise, hardening the endosperm of soft wheat by wet heat treatment (Bulgar wheat) is practiced to prepare large grits or wheat cracks from soft wheat (A. W. Suhasini and N. G. Malleshi, Studies on preparation, popping and functional properties of bulgar wheat. Die Nahrung, Vol. 38, 568–577, 1994).

One drawback of the hitherto-followed millet milling processes is that, these methods form grits and flour from the millet instead of decorticated millet grains. The process followed for milling of wet heat treated rice and wheat can not be applied to finger millet because, the morphology of millet kernels (smaller size, spherical shape and intactness of the seed coat with the endosperm) differs from that of rice (the husk that covers the rice is a separate entity which is loosely attached with the inner caryopsis) and wheat (bigger grain with thin multiple layers of seed coat, namely, the bran is separable easily). Hence, generally the millet grains are pulverized and the whole meal millet is utilized for food. This limits the usage of the millet only to flour based traditional foods such as roti and mudde, typically by traditional consumers, and not in the form similar to cooked rice or wheat semolina.

Another drawback of the hitherto-known millet milling processes is that, foods based on whole meal happens to be sticky and slimy and also have a characteristic odor. These factors affect the sensory qualities and in turn the acceptability of the millet products.

Thus, neither a process for decortication of millet nor a decorticated finger millet are commercially available in any part of the world to the best of the Applicant's knowledge.

One aspect of the present invention provides a decorticated finger millet.

Another aspect of the present invention provides a decorticated finger millet having the physicochemical characteristics described below.

A further aspect of the present invention provides a process for preparation of decorticated finger millet.

Still another aspect of the present invention provide a process for preparation of decorticated finger millet, that can be cooked similar to rice or can be pulverized to prepare grits or flour similar to wheat for various food uses.

DETAILED DESCRIPTION

One embodiment of the present invention provides a decorticated finger millet (*Eleusine coracana*) having the following physicochemical characteristics:

| | |
|---|---|
| (a) Appearance: | Spherical and opaque |
| (b) Color (% whiteness): | Light Cream (10.8) |

-continued

| | | |
|---|---|---|
| (c) | Hardness (Kg/cm²): | about 7.1 |
| (d) | 1000 kernel wt (g): | about 2.6 |
| (e) | 1000 kernel volume (ml): | about 1.7 |
| (f) | Density (m/v): | about 1.501 |
| (g) | Protein (g %): | about 6.3 |
| (h) | Fat (g %): | about 0.9 |
| (i) | Minerals (g %): | about 1.0 |
| (j) | Acid insoluble ash (%): | about 0.07 |
| (k) | Calcium (mg %): | about 1.80 |
| (l) | Dietary Fiber (%): | about 14.7 |
| (m) | Available carbohydrate (% by difference): | about 66.5 |
| (n) | Phosphorous (mg %): | about 109 |
| (o) | Phytate (mg %): | about 142 |
| (p) | Polyphenols (mg %) (Catechin equivalent): | about 67 |
| (q) | Equilibrium moisture content (%), at 30° C.: | about 68 |
| (r) | Solubility (%), at 30° C.: | about 8.5 |
| (s) | Swelling (%), at 30° C.:: | about 190 |
| (t) | Swelling (%), at 80° C.: | about 270 and |
| (u) | Cooking time (min): | about 5 |

Wherein "about" indicates that the value may vary by small margin on either side.

In an embodiment of the present invention, the decorticated finger millet has the following physicochemical characteristics:

| | | |
|---|---|---|
| (a) | Appearance: | Spherical and opaque |
| (b) | Color (% whiteness): | Light Cream (10.8) |
| (c) | Hardness (Kg/cm²): | 7.1 |
| (d) | 1000 kernel wt (g): | 2.6 |
| (e) | 1000 kernel volume (ml): | 1.7 |
| (f) | Density (m/v): | 1.501 |
| (g) | Protein (g %): | 6.3 |
| (h) | Fat (g %): | 0.9 |
| (i) | Minerals (g %): | 1.0 |
| (j) | Acid insoluble ash (%): | 0.07 |
| (k) | Calcium (mg %): | 1.80 |
| (l) | Dietary Fiber (%): | 14.7 |
| (m) | Available carbohydrate (% by difference): | 66.5 |
| (n) | Phosphorous (mg %): | 109 |
| (o) | Phytate (mg %): | 142 |
| (p) | Polyphenols (mg %) (Catechin equivalent): | 67 |
| (q) | Equilibrium moisture content (%), at 30° C.: | 68 |
| (r) | Solubility (%), at 30° C.: | 8.5 |
| (s) | Swelling (%), at 30° C.:: | 190 |
| (t) | Swelling (%), at 80° C.: | 270 and |
| (u) | Cooking time (min): | 5 |

The present invention also provides a process for decorticating finger millet (*Eleusine coracana*), with one embodiment of said process comprising:

(a) hydrating the millet near to its saturation moisture content;
(b) heat treating the hydrated millet to induce starch gelatinisation, rupture of granular structure, formation of lipid amylose complex and healing of cracks present in the endosperm;
(c) controlled drying the heat-treated millet to induce retrogradation of starch, hardening of endosperm tissue and reduction in the intactness of the endosperm with seed coat;
(d) moistening and short tempering the millet obtained from step "c" to impart leathery texture to the seed coat, and
(e) passing the millet thus obtained through conventional abrasive mills to detach/remove the seed coat.

In an embodiment of the present invention, the millet is optionally cleaned before soaking it in the water.

In another embodiment of the present invention, the millet is hydrated using potable water.

In still another embodiment of the present invention, the water adsorbed to the hydrated millet is drained before subjecting it to heat-treatment process.

In yet another embodiment of the present invention, the hydrated millet is heat-treated by steaming.

In a further embodiment of the present invention, the steaming may be done at atmospheric pressure or at pressures up to 5 Kg/cm².

In one more embodiment of the present invention, the heat-treated millet is dried using mechanical drier or dried under sun or dried under shade.

In one other embodiment of the present invention, the heat-treated millet is moistened using potable water.

In an embodiment of the present invention, the seed coat detached during milling is aspired off.

A further embodiment of the present invention more particularly provides a process for decorticating finger millet that comprises:

(a) soaking or steeping the millet in a minimum of 0.4 (w/v) water at 20–70° C. for 2–16 hr;
(b) draining the adsorbed water if any and steaming the soaked millet either at atmospheric or at pressure up to 5.0 kg/cm², for 2–20 min;
(c) drying the millet obtained from the aforesaid step, to 8–16% moisture content by conventional mechanisms, and
(d) mixing the dried millet obtained from the aforesaid step, with 3–8% additional water, tempering for 10–1 S min and decorticating the same in abrasive mills and aspirating off the seed coat.

In an embodiment of the present invention, said process for decortication most preferably comprises:

(a) cleaning the millet manually or mechanically;
(b) soaking or steeping the cleaned millet in a minimum of 0.4 (w/v) potable water at 20–70° C. for 2–16 hr;
(c) washing the millet with a minimum of 2–3 volumes of potable water till it is free from light floating surface contaminants, undesirable odor and the leachates;
(d) draining the adsorbed water if any and steaming the soaked millet either at atmospheric or at pressure up to 5.0 Kg/cm² for 2–20 min;
(e) drying the millet obtained from 'step d', to 8–16% moisture content in a mechanical drier maintained at 30–60° C. or in sun/shade, and
(f) mixing the dried millet obtained from 'step e' with 3–8% additional water, tempering for 10–15 min and decorticating the same in abrasive mill and aspirating off the seed coat.

In an embodiment of the present invention, the cleaned millet may be steeped or soaked in 0.4–1.2 volumes potable water at 20–70° C. for 4–16 hr.

In another embodiment of the present invention, the steeped millet may be boiled in water for 10–20 min or steamed at pressures up to 5 kg/cm² for 3–20 min.

In yet another embodiment of the present invention, the soaked or steamed millet is dried to 8–16% moisture content in sun/shade or in a mechanical drier maintained at 30–60° C.

In a still another embodiment of the present invention, the dried millet may be mixed with 4–8% additional water, tempered for 10–15 min. and decorticated, preferably, in an emery coated abrasive mill to 5–20% degree of decortication and the decorticated millet may be separated from the seed coat detached during decortication, mechanically or manually, by gravity, winnowing or by aspiration.

Although, the invention is described in detail with reference to specific embodiment thereof, it will be understood that, variations, which are functionally equivalent are within the scope of this invention. Indeed, various modifications of the invention, in addition to those shown and described therein, will became apparent to those skilled in the art from the pre-going description. Such modifications are intended to fall within the scope of the invention and appended claims.

A novel features of one embodiment is that, it permits utilization of millet grown at different agro-climatic conditions, kernels of varying size, shape, color and hardness. Hydrating the millet near to its saturation moisture content and subjecting it to heat treatment by steam or any such other means modifies the characteristics of the biochemical components of the millet kernel. The notable changes of the modification include starch gelatinisation, rupture of its granular structure and formation of lipid-amylose complexes, and healing the cracks present in the endosperm. Controlled drying, further induces an array of chemical and textural changes resulting in retrogradation of starch, hardening of the endosperm tissue and reducing the intactness of the seed coat with the endosperm. Subsequently, incipient moistening and short duration tempering imparts leathery texture to the seed coat and facilitates its easy separation during decortication. Moreover, the process improves the overall nutritional qualities of the millet due to fixing of thiamine and some of the minerals with the endosperm, thereby limiting the loss of these nutrients during washing and cooking. Denaturing enzyme inhibitors and lowering the concentration of polyphenols and phytates may also the nutritional quality of the millet prepared by this process. In addition, the shelf-life of the millet products is also improved due to inactivation of the lipases and hardening the endosperm.

The decorticated millet prepared following one exemplary process will be of light cream color, translucent or chalky texture with smooth surface, besides, it is free from seed coat and the characteristics musty odor, normally associated with the millet. Hence, it will have better consumer appeal, improved storage life and enhanced nutritional quality. Since, the decorticated millet contains complex carbohydrates, good amount of dietary fiber and micronutrients, it could be hypoglycemic and hypocholesterolemic. It may, not only be useful for conventional foods but also find utilization as a cereal base for several health foods, e.g., food for diabetes and functional foods such as slimming foods.

The novelty of embodiments of the process lies in their simplicity, adaptability from home to industrial scale and improving the overall nutritional and culinary qualities of the millet without subjecting it to any chemical or health hazardous treatments.

BRIEF DESCRIPTION OF THE ACCOMPANYING DRAWING

In the drawing accompanying this specification, FIG. 1 represents salient features of a process for preparation of the decorticated millet.

BRIEF DESCRIPTION OF THE ACCOMPANYING TABLES

In the tables accompanying the specification,
Table 1 represents the yield of milling fractions of millet milled as such and after moist-conditioning.
Table 2 represents yield of milling fractions of millet milled as such and after moist-conditioning.
Table 3 gives the physicochemical characteristics of the decorticated millet.

The following examples are given by way of illustration of the present invention and therefore should not be construed to limit the scope of the present invention.

EXAMPLE—1

Twenty five kilograms of the millet cleaned off the extraneous matter manually was washed with a minimum of two volumes of potable water 2 times and soaked in 40 L water at 28° C. for 12 hr. The soaked material was washed again to free it from the floatiings and leachates and was collected over a 25 mesh metallic screen to drain off the adsorbed water, followed by spreading in 10 Nos. of 1.5'× 3'×2" dimension metallic trays. The trays were placed one above another in an autoclave, the top tray was covered with another tray and the material was steamed at atmospheric pressure for 20 min. The steamed millet was dried to 12% moisture content in a mechanical air drier maintained at 40° C. A portion of the dried millet was decorticated in an emery coated horizontal plate mill, adjusted to 1.4 mm clearance between the plates and the other portion was mixed with 5.0% additional water, tempered for 10 min and decorticated in the same mill. The seed coat detached during milling was aspirated off The decorticated millet (head grains) were separated from the grits (brokens) by sieving through 16 mesh (BSS) sieve. The milling fractions were equilibrated and weighed (Table 1).

TABLE 1

Yield of milling fractions of millet milled as such and after moist-conditioning

| S. No. | Yield (g %) | Decorticated Without Moist Conditioning | Decorticated With Moist Conditioning |
|---|---|---|---|
| 1. | Decorticated head grains | 45.0 | 81.5 |
| 2. | Brokens (crushed millet or grits) | 35.0 | 3.5 |
| 3. | Seed coat | 20.0 | 15.0 |
| 4. | Color (% Whiteness) | 6.5 | 9.0 |

EXAMPLE—2

Twenty five kilograms of the millet cleaned off the extraneous matter manually was washed with a minimum of two volumes of potable water 2 times and soaked in 40 L water at 28° C. for 12 hr. The soaked material was washed again to free it from the floatiings and leachates and was collected over a 25 mesh (BSS) metallic screen to drain off the adsorbed water, followed by spreading in 10 Nos. of 1.5'×3'×2" dimension metallic trays. The trays were placed one above another in an autoclave, the top tray was covered with another tray and the material was steamed at 5 kg/cm$^2$ pressure for 2 min. The steamed millet was dried to 12% moisture content in a mechanical air drier maintained at 40° C. A portion of the dried millet was decorticated in an emery coated horizontal plate mill, adjusted to 1.4 mm clearance between the plates and the other portion was mixed with 5.0% additional water, tempered for 10 min and decorticated in the same mill. The seed coat detached during milling was aspirated off. The decorticated millet (head grains) were separated from the grits (brokens) by sieving through mesh (BSS) sieve. The milling fractions were equilibrated and weighed.

TABLE 2 yield if milling fractions of millet milled as such and after moist-conditioning

| S. No. | Yield (g %) | Decorticated Without Moist Conditioning | Decorticated With Moist Conditioning |
|---|---|---|---|
| 1. | Decorticated head grains | 47.0 | 83.0 |
| 2. | Brokens (crushed millet or grits) | 33.0 | 1.5 |
| 3. | Seed coat | 20.0 | 15.5 |
| 4. | Color (% Whiteness) | 6.5 | 9.0 |

EXAMPLE—3

One hundred kilo grams of finger millet was cleaned using destoner and was washed with a minimum of 2 volumes of potable water 2 times and soaked in 60 L water at 28° C. for 12 hr. The soaked material was washed again to free from floatings and leachates and was collected over a 25 mesh metallic screen to drain off the adsorbed water, followed by spreading in 40 Nos. of 1.5'×3'×2" dimension metallic trays. Ten trays containing the soaked millet at a time, were placed one above another in an autoclave, the top tray was covered with another tray and steamed at atmospheric pressure for 20 min. The steamed millet was dried to 12% moisture content in a mechanical air drier maintained at 40° C. The product was graded by sifting through 1.4 mm and 1.0 mm opening metallic screens successively. The millet grains bigger than 1.4 mm, smaller than 1.4 and bigger than 1.0 mm, and smaller than 1.0 mm, diameter were collected separately. Thus graded millet was mixed with 5% additional water, tempered for 10 min and decorticated in a horizontal emery coated plate mill (fitted with 3' diameter and 6" thick plates) adjusted to 1.4, 1.2 and 1.0 mm clearance between the plates respectively. The seed coat was aspirated off and the decorticated millet was sifted in a vertical rotary sifter fitted with 0.9 mm screen to separate the decorticated head grains from the brokens or grits. The fractions were equilibrated and weighed. The yield of decorticated head grains, brokens and the seed coat were 80.6, 4.1 and 15.3% respectively. The information on some of quality attributes of the native and the decorticated millet are presented in Table 3.

The Advantages of embodiments of the present invention include:

1. Soaking the millet in water hydrates the kernels to their near saturation point (32±2% moisture content) and steaming the hydrated millet gelatinizes its starch content, ruptures its granular structure and facilitates amylose and lipids complexing. In other words, the retrogradation of the starch occurs during wet heat treatment and as a result, the floury endosperm modules to corneus texture, thereby preventing its breakage during decortication. On soaking, the grains swell and steaming the same heals the fissures present in the endosperm. Further, drying the steamed millet contracts the endosperm. These physico-chemical changes reduce the intactness between the seed coat and the starchy endosperm and also facilitate easy decortication.
2. The decorticated millets could be cooked to soft texture similar to rice just within 5 min, which has not been possible hitherto and also it could be pulverized into flour or grits for conventional food preparations.
3. One of the milling by-products, namely the grits could be used similar to wheat semolina or soji, or it could be pulverized to flour for traditional foods.
4. There exists scope to prepare flaked, popped and other novelty foods from the decorticated millet similar to other cereals such as rice, wheat and maize.
5. By this process, the nutritional quality of the millet improves because of the enhanced retention of some of the water-soluble nutrients and reduction in the concentration of the antinutritional factors such as phytates, enzyme inhibitors and the seed borne microflora.
6. The storage quality of the processed millet is also enhanced because of inactivation of lipase as well as hardening of the endosperm.
7. It is altogether a new process for processing of millet which is not followed hitherto anywhere in the country and abroad to the best of our knowledge.

TABLE 3 physicochemical characteristics of the decorticated millet

| Characteristics | Native | Decorticated |
|---|---|---|
| Appearance: | Spherical | Spherical and opaque |
| Color (% whiteness): | Brown (3.2) | Light Cream (10.8) |
| Hardness (Kg/cm$^2$): | 1.1 | 7.1 |
| 1000 kernel wt (g): | 2.9 | 2.6 |
| 1000 kernel volume (ml): | 2.1 | 1.7 |
| Density (m/v): | 1.379 | 1.501 |
| Protein (g %): | 8.1 | 6.3 |
| Fat (g %): | 1.5 | 0.9 |
| Minerals (g %): | 1.9 | 1.0 |
| Acid insoluble ash (%): | 0.12 | 0.07 |
| Calcium (mg %): | 317 | 1.80 |
| Dietary Fiber (%): | 22.2 | 14.7 |
| Available carbohydrate (% by difference): | 53.9 | 66.5 |
| Phosphorous (mg %): | 211 | 109 |
| Phytate (mg %): | 236 | 142 |
| Polyphenols (mg %) (Catechin equivalent) | 265 | 67 |
| Equilibrium moisture content (%), at 30° C. | 33 | 68 |
| Solubility (%), at 30° C.: | 3.9 | 8.5 |
| Swelling (%), at 30° C.: | 70 | 190 |
| Swelling (%), at 80° C.: | 260 | 270 and |
| Cooking time (min): | 17 | 5 |

The invention claimed is:

1. A decorticated finger millet having the following physicochemical characteristics:

| | | |
|---|---|---|
| (a) | Appearance: | Spherical and opaque |
| (b) | Color: | Light Cream |
| (c) | Whiteness Index: | 10.8 |
| (d) | Hardness: | about 7.1 Kg/cm$^2$ |
| (e) | 1000 kernel weight: | about 2.6 g |
| (f) | 1000 kernel volume: | about 1.7 ml |
| (g) | Protein: | about 6.3 g/100 g |
| (h) | Fat: | about 0.9 g/100 g |
| (i) | Minerals: | about 1.0 g/100 g |
| (j) | Acid insoluble ash: | about 0.07 g/100 g |
| (k) | Calcium: | about 1.80 g/100 g |
| (l) | Dietary Fiber: | about 14.7 g/100 g |

-continued

| | | |
|---|---|---|
| (m) | Available carbohydrate (% by difference): | about 66.5 g/100 g |
| (n) | Phosphorous: | about 109 mg/100 g |
| (o) | Phytate (%): | about 142 mg/100 g |
| (p) | Polyphenols (mg %) (Catechin equivalent): | about 67 mg/100 g |
| (q) | Cooking time: | about 5 minutes. |

2. A process for decorticating finger millet (*Eleusine coracana*), said process comprising:
   (a) hydrating the millet near to its saturation moisture content;
   (b) heat treating the hydrated millet to induce starch gelatinisation, rupture of granular structure, formation of lipid amylose complex and healing of cracks present in the endosperm;
   (c) controlled drying the heat-treated millet to induce retrogradation of starch, hardening of endosperm tissue and reduction in the intactness of the endosperm with seed coat;
   (d) moistening and short tempering the millet obtained from step "c" to impart leathery texture to the seed coat, and
   (e) passing the millet thus obtained through an abrasive mill to detach the seed coat.

3. A process as claimed in claim 2, wherein the millet is optionally cleaned before soaking it in the water.

4. A process as claimed in claim 2, wherein the millet is hydrated using potable water.

5. A process as claimed in claim 2, wherein the hydrated millet is heat-treated by steaming.

6. A process as claimed in claim 5, wherein the steaming is done at atmospheric pressure or at pressures up to 5 $Kg/cm^2$.

7. A process as claimed in claim 2, wherein the heat-treated millet is dried using mechanical drier or dried under sun or dried under shade.

8. A process as claimed in claim 2, wherein the heat-treated millet is moistened using potable water.

9. A process as claimed in claim 2, wherein the seed coat detached during milling is aspired off.

10. A process as claimed in claim 2, wherein:
    (a) hydrating the millet comprises soaking or steeping the millet in a minimum of 0.4 (w/v) of water at 20–70° C. for 2–16 hr;
    (b) heat treating the millet comprises steaming the soaked millet either at atmospheric pressure or at pressure up to 5.0 $kg/cm^2$, for 2–20 min;
    (c) the controlled drying comprises drying the millet obtained from the aforesaid step to 8–16% moisture content by conventional mechanisms;
    (d) moistening and short tempering the millet comprises mixing the dried millet obtained from the aforesaid step with 3–8% additional water and tempering for 10–15min; and
    (e) detaching the seed coat comprises decorticating the millet in an abrasive mill and aspirating off the seed coat.

11. A process as claimed in claim 2, wherein:
    (a) the process further comprises cleaning the millet manually or mechanically;
    (b) hydrating the millet comprises soaking or steeping the cleaned millet in a minimum of 0.4 (w/v) potable water at 20–70° C. for 2–16 hr;
    (c) the process further comprises washing the millet with a minimum of 2 volumes of potable water till it is free from light floating surface contaminants, undesirable odor and the leachates;
    (d) heat treating the millet comprises steaming the soaked millet either at atmospheric pressure or at pressure up to 5.0 $Kg/cm^2$ for 2–20 min;
    (e) the controlled drying comprises drying the millet obtained from the aforesaid step to 8–16% moisture content in a mechanical drier maintained at 30–60° C. or in sun or under shade;
    (f) moistening and short tempering the millet comprises mixing the dried millet obtained from 'step e' with 3–8% additional water and tempering for 10–15 min; and
    (g) detaching the seed coat comprises decorticating the millet in an abrasive mill and aspirating off the seed coat.

12. A process as claimed in claim 2, wherein, the millet is soaked in potable water at 20–70° C. for 4–16 hr, wet-heat treated by boiling in water for 15–30 min or steaming pressures up to 5 $kg/cm^2$, drying in sun or shade or mechanically to 8–14% moisture level and mixing the dried millet with 3–7% additional water, tempering for 10–15 min and decorticating in any of the cereal milling machinery and then separating the decorticated millet manually or mechanically.

13. A process as claimed in claim 2, wherein the decorticated millet thus produced has the following physicochemical characteristics:

| | | |
|---|---|---|
| (a) | Appearance: | Spherical and opaque |
| (b) | Color: | Light Cream |
| (c) | Whiteness Index: | 10.8 |
| (d) | Hardness: | about 7.1 ($Kg/cm^2$) |
| (e) | 1000 kernel weight: | about 2.6 g |
| (f) | 1000 kernel volume: | about 1.7 ml |
| (g) | Protein: | about 6.3 g/100 g |
| (h) | Fat: | about 0.9 g/100 g |
| (i) | Minerals: | about 1.0 g/100 g |
| (j) | Acid insoluble ash: | about 0.07 g/100 g |
| (k) | Calcium: | about 1.80 g/100 g |
| (l) | Dietary Fiber: | about 14.7 g/100 g |
| (m) | Available carbohydrate (% by difference): | about 66.5 g/100 g |
| (n) | Phosphorous: | about 109 mg/100 g |
| (o) | Phytate (%): | about 142 mg/100 g |
| (p) | Polyphenols (mg %) (Catechin equivalent): | about 67 mg/100 g |
| (q) | Cooking time: | about 5 minutes. |

14. A decorticated finger millet having the following physicochemical characteristics:

| | | |
|---|---|---|
| (a) | Appearance: | opaque |
| (b) | Color: | light cream |
| (c) | Hardness: | about 7.1 $Kg/cm^2$ |
| (d) | Protein: | about 6.3 weight percent |
| (e) | Fat: | about 0.9 weight percent |
| (f) | Minerals: | about 1.0 weight percent |
| (g) | Acic insoluble ash: | about 0.07 weight percent |
| (h) | Dietary Fiber: | about 14.7 weight percent |
| (i) | Available carbohydrate (% by difference): | about 66.5 weight percent |
| (j) | Swelling at 30° C.: | about 190 percent |
| (k) | Swelling at 80° C.: | about 270 percent |
| (l) | Cooking time: | about 5 minutes. |

* * * * *